US 011122036B2

(12) United States Patent
Bhatt et al.

(10) Patent No.: US 11,122,036 B2
(45) Date of Patent: Sep. 14, 2021

(54) SYSTEMS AND METHODS FOR MANAGING DIGITAL IDENTITIES ASSOCIATED WITH MOBILE DEVICES

(71) Applicant: MASTERCARD INTERNATIONAL INCORPORATED, Purchase, NY (US)

(72) Inventors: Sumeet Bhatt, Jericho, NY (US); Ashfaq Kamal, Stamford, CT (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 114 days.

(21) Appl. No.: 16/134,348

(22) Filed: Sep. 18, 2018

(65) Prior Publication Data

US 2019/0089702 A1    Mar. 21, 2019

Related U.S. Application Data

(60) Provisional application No. 62/560,016, filed on Sep. 18, 2017, provisional application No. 62/560,039, filed on Sep. 18, 2017.

(51) Int. Cl.
*H04L 29/06*        (2006.01)
*H04L 9/08*         (2006.01)
(Continued)

(52) U.S. Cl.
CPC ....... *H04L 63/0861* (2013.01); *G06Q 50/265* (2013.01); *H04L 9/0825* (2013.01);
(Continued)

(58) Field of Classification Search
CPC ............. H04L 63/0861; H04L 63/0442; H04L 63/0853; H04L 63/0884; H04L 9/0825; H04W 12/06; G06Q 50/265
See application file for complete search history.

(56) References Cited

U.S. PATENT DOCUMENTS

| 7,680,819 | B1 | 3/2010 | Mellmer et al. |
| 10,476,862 | B2 | 11/2019 | Kamal |

(Continued)

FOREIGN PATENT DOCUMENTS

| CA | 2886548 A1 | 9/2015 |
| EP | 3073670 A1 | 9/2016 |

OTHER PUBLICATIONS

U.S. Appl. No. 16/134,371, filed Sep. 18, 2018, Bhatt et al.

(Continued)

*Primary Examiner* — Noura Zoubair
(74) *Attorney, Agent, or Firm* — Harness, Dickey & Pierce, P.L.C.

(57) ABSTRACT

Systems and methods are provided for use in enabling, providing, and managing digital identities in association with mobile communication devices. One exemplary method includes capturing an image of a physical document comprising a biometric of a user associated with the physical document, and extracting the biometric from the image and converting it to a biometric template. The method also includes capturing a biometric of the user and comparing it to the biometric template. The method then includes, when the captured biometric matches the biometric template, transmitting a message to an identification provider comprising at least the image of the physical document and the biometric template, whereby the biometric template is verified against a repository, and binding data representative of the mobile communication device, a mobile application included therein, and the biometric template and/or the captured biometric of the user into a token.

20 Claims, 5 Drawing Sheets

(51) Int. Cl.
*H04W 12/06* (2021.01)
*G06Q 50/26* (2012.01)
*G06Q 20/40* (2012.01)
*H04W 12/65* (2021.01)
*G06Q 20/34* (2012.01)

(52) U.S. Cl.
CPC ...... *H04L 63/0442* (2013.01); *H04L 63/0853* (2013.01); *H04L 63/0884* (2013.01); *H04W 12/06* (2013.01); *G06Q 20/34* (2013.01); *G06Q 20/4014* (2013.01); *G06Q 20/40145* (2013.01); *H04L 63/0815* (2013.01); *H04W 12/65* (2021.01)

(56) References Cited

U.S. PATENT DOCUMENTS

| | | |
|---|---|---|
| 2006/0000892 A1 | 1/2006 | Bonalle et al. |
| 2006/0157559 A1 | 7/2006 | Levy et al. |
| 2007/0208869 A1 | 9/2007 | Adelman et al. |
| 2007/0214093 A1 | 9/2007 | Colella |
| 2007/0250704 A1 | 10/2007 | Hallam-Baker |
| 2008/0256594 A1 | 10/2008 | Satish et al. |
| 2009/0164526 A1 | 6/2009 | Hayashi |
| 2011/0191829 A1 | 8/2011 | Fischer et al. |
| 2011/0289318 A1 | 11/2011 | Zhang et al. |
| 2014/0068722 A1 | 3/2014 | Hayat |
| 2014/0101453 A1* | 4/2014 | Senthurpandi ......... G06F 21/32 713/172 |
| 2014/0279516 A1* | 9/2014 | Rellas ................. G06Q 30/0185 705/44 |
| 2015/0038118 A1 | 2/2015 | Berteau et al. |
| 2015/0059003 A1 | 2/2015 | Bouse |
| 2015/0295906 A1 | 10/2015 | Ufford et al. |
| 2015/0319170 A1 | 11/2015 | Grossemy |
| 2015/0356523 A1 | 12/2015 | Madden |
| 2016/0210621 A1* | 7/2016 | Khan .................... H04L 9/00 |
| 2016/0239653 A1* | 8/2016 | Loughlin-Mchugh ...................... G06F 21/35 |
| 2016/0300236 A1 | 10/2016 | Wiley et al. |
| 2016/0328713 A1 | 11/2016 | Ebrahimi |
| 2016/0330035 A1 | 11/2016 | Ebrahimi et al. |
| 2016/0364703 A1 | 12/2016 | Bhatt et al. |
| 2016/0364730 A1 | 12/2016 | Rans et al. |
| 2017/0201498 A1 | 7/2017 | Baig et al. |
| 2017/0222814 A1 | 8/2017 | Oberhauser et al. |
| 2017/0257358 A1 | 9/2017 | Ebrahimi et al. |
| 2017/0316409 A1 | 11/2017 | Smith et al. |
| 2018/0048864 A1 | 2/2018 | Taylor et al. |
| 2018/0165781 A1 | 6/2018 | Rodriguez et al. |
| 2018/0204191 A1 | 7/2018 | Wilson et al. |
| 2018/0351747 A1 | 12/2018 | Spangemacher et al. |
| 2019/0087825 A1 | 3/2019 | Bhatt et al. |
| 2019/0230496 A1 | 7/2019 | Wane |

OTHER PUBLICATIONS

U.S. Appl. No. 15/476,526, filed Mar. 31, 2017, Ashfaq Kamal.
U.S. Appl. No. 15/891,062, filed Feb. 7, 2018, Iyer et al.
F. No. K-11020/217/2018-UISAI (Auth-I), Government of India; https://uidai.gov.in/images/resource/UIDAI_Circular_11012018.pdf; Jan. 10, 2018; 5 pgs.
Times of India; Use 16-digit virtual No. for KYC; https://timesofindia.indiatimes.com/business/india-business/use-16-digit-virtual-no-for-kyc-fromtoday/articleshow/64810724.cms; web accessed Oct. 2, 2018; 56 pgs.
Economic Times; UIDAI introduces new two-layer security system to improve Aadhaar privacy; https://economictimes.indiatimes.com/news/economy/policy/uidai-introduces-new-two-layersecurity-system-to-improve-aadhaar-privacy/articleshow/62442873.cms; web accessed Oct. 2, 2018; 6 pgs.
"Moving Beyond Social Security Numbers"; Blake Hall; https://medium.com/@blake_hall/moving-beyond-social-security-numbers-part-3-283bbf28ce74; Oct. 11, 2017; 5 pgs.
"Are you overlooking toeknization as a data security measure?"; Linda Musthaler; https://www.networkworld.com/article/3002307/security/are-you-overlooking-tokenization-as-adata-security-measure.html; Nov. 6, 2015; 5 pgs.
"Digital Identity—Why Now?"; David G. W. Birch; https://www.paymentsnz.co.nz/.../Digital_Identity_Seminar_Presentation_Final.pdf; Jan. 8, 2017; 79 pgs.
"Your guide to UPI—the world's most advanced payments system"; Sasi Desai et al.; https://medium.com/wharton-fintech/your-guide-to-upi-the-worlds-most-advanced-payments-system-b4e0b372bf0b; May 11, 2017; 20 pgs.
"Lessons from the World's Largest e-Identity Program"; procivis; https://procivis.ch/2018/02/13/lessons-from-the-worlds-largest-e-identity-program-indias-aadhaar/; Feb. 13, 2018; 6 pgs.
Times of India; "Treat virtual ID, UID token as Aadhaar number"; https://timesofindia.indiatimes.com/business/india-business/treat-virtual-id-uid-token-as-aadhaar-number-uidai-to-agencies/articleshow/65038574.cms; Jul. 18, 2018; 3 pgs.
Neustar; "Neustar Selected as Digital Identity Solution Partner for Visa's ID Intelligence Ecosystem"; https://www.home.neustar/about-us/news-room/press-releases/2017/VisaIDIntelligence; Oct. 24, 2017; 1 pg.
Crush Crypto; Selfkey ICO Review—Digital Identity Management System; https://crushcrypto.com/analysis-of-selfkey/; Dec. 5, 2017; 6 pgs.

* cited by examiner

SYSTEMS AND METHODS FOR MANAGING DIGITAL IDENTITIES ASSOCIATED WITH MOBILE DEVICES

CROSS-REFERENCE TO RELATED APPLICATIONS

This application claims the benefit of, and priority to, U.S. Provisional Application No. 62/560,016, filed on Sep. 18, 2017, and U.S. Provisional Application No. 62/560,039, filed on Sep. 18, 2017. The entire disclosures of the above referenced applications are incorporated herein by reference.

FIELD

The present disclosure is generally directed to systems and methods for use in enabling and providing digital identities associated with mobile devices and, in particular, to systems and methods for use in verifying biometric templates in mobile devices, based on physical documents associated with users and/or their biometrics, against repositories of biometric data, whereby when the biometric templates are verified the digital identities are provisioned to the mobile devices for subsequent use. The present disclosure also relates to systems and methods for use in managing access to digital identities associated with mobile devices, and in authenticating users associated with such digital identities apart from mobile applications associated with their mobile devices, when identification data associated with the users is changed.

BACKGROUND

This section provides background information related to the present disclosure which is not necessarily prior art.

People are known to be associated with identities. The identities are generally specific to the people and often include their names, government-based identifiers (e.g., Aadhaar numbers, social security numbers, etc.), mailing addresses, phone numbers, email addresses, etc. And, the identities of the people are often verified, by relying parties, through one or more physical documents, such as, for example, driver's licenses, government issued cards or documents (e.g., birth certificates, etc.), utility bills, etc. In addition, the identities of the people may further be provided in the form of digital identities, which include network or Internet equivalents to physical documents and/or identities of the people for identification in connection with network transactions. In connection therewith, when people apply for accounts, they are often required, by issuers of the accounts, to present proof of their identity, which may be provided through one or more such physical documents or via the digital identities. Account issuers or other parties (i.e., the relying parties) may then rely on the identities, evidenced by the physical documents and/or the digital identities, to interact with the people as being the people they are supposed to be and/or conduct business therewith.

DRAWINGS

The drawings described herein are for illustrative purposes only of selected embodiments and not all possible implementations, and are not intended to limit the scope of the present disclosure.

Figure 1:
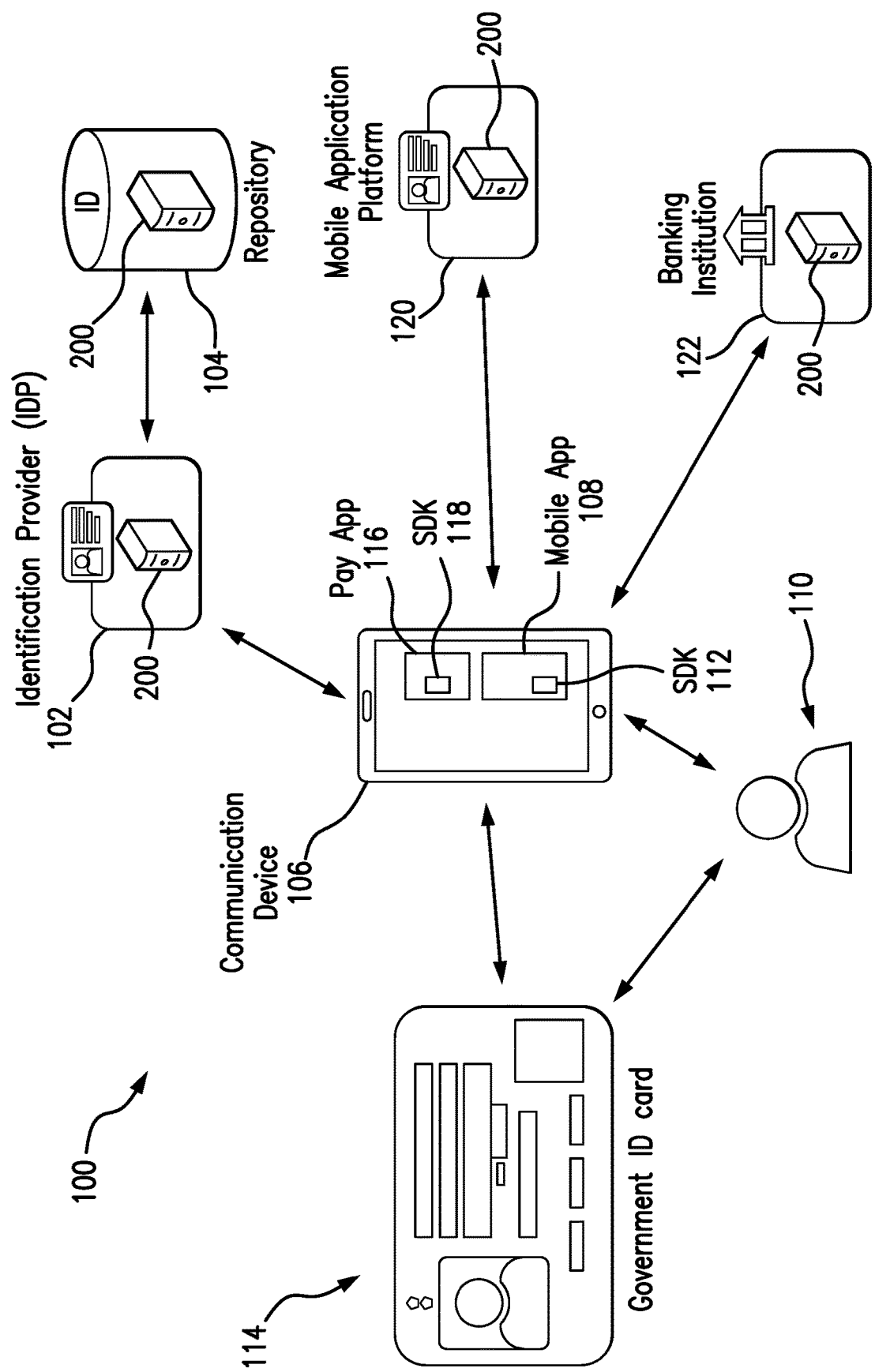
FIG. 1 illustrates an exemplary system of the present disclosure suitable for use in enabling digital identities (e.g., biometric identities, etc.) in connection with mobile devices so that the digital identities may be subsequently provided to relying parties via the mobile devices, and also suitable for use in managing access to the digital identities.
Figure 4:
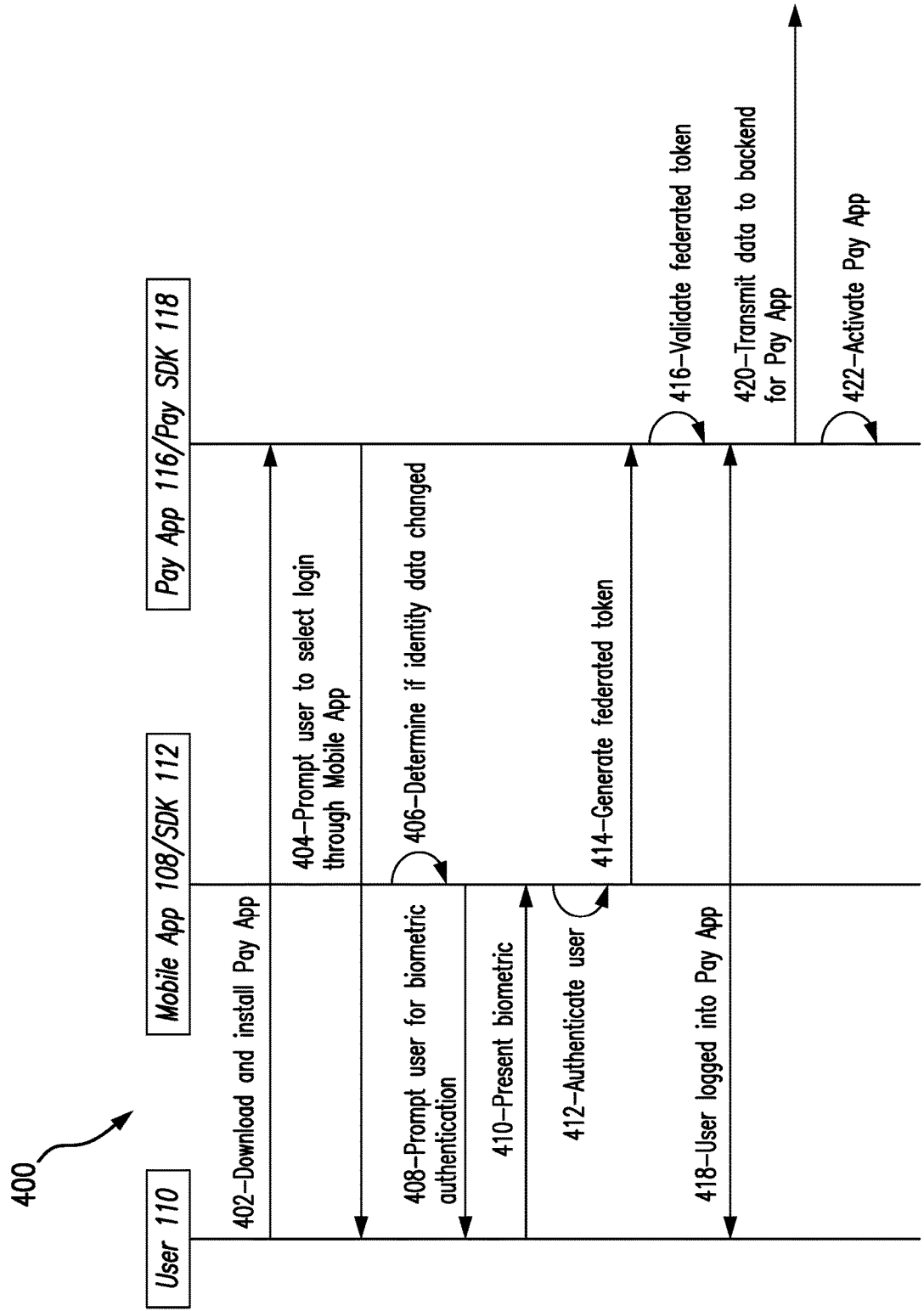
Figure 5:
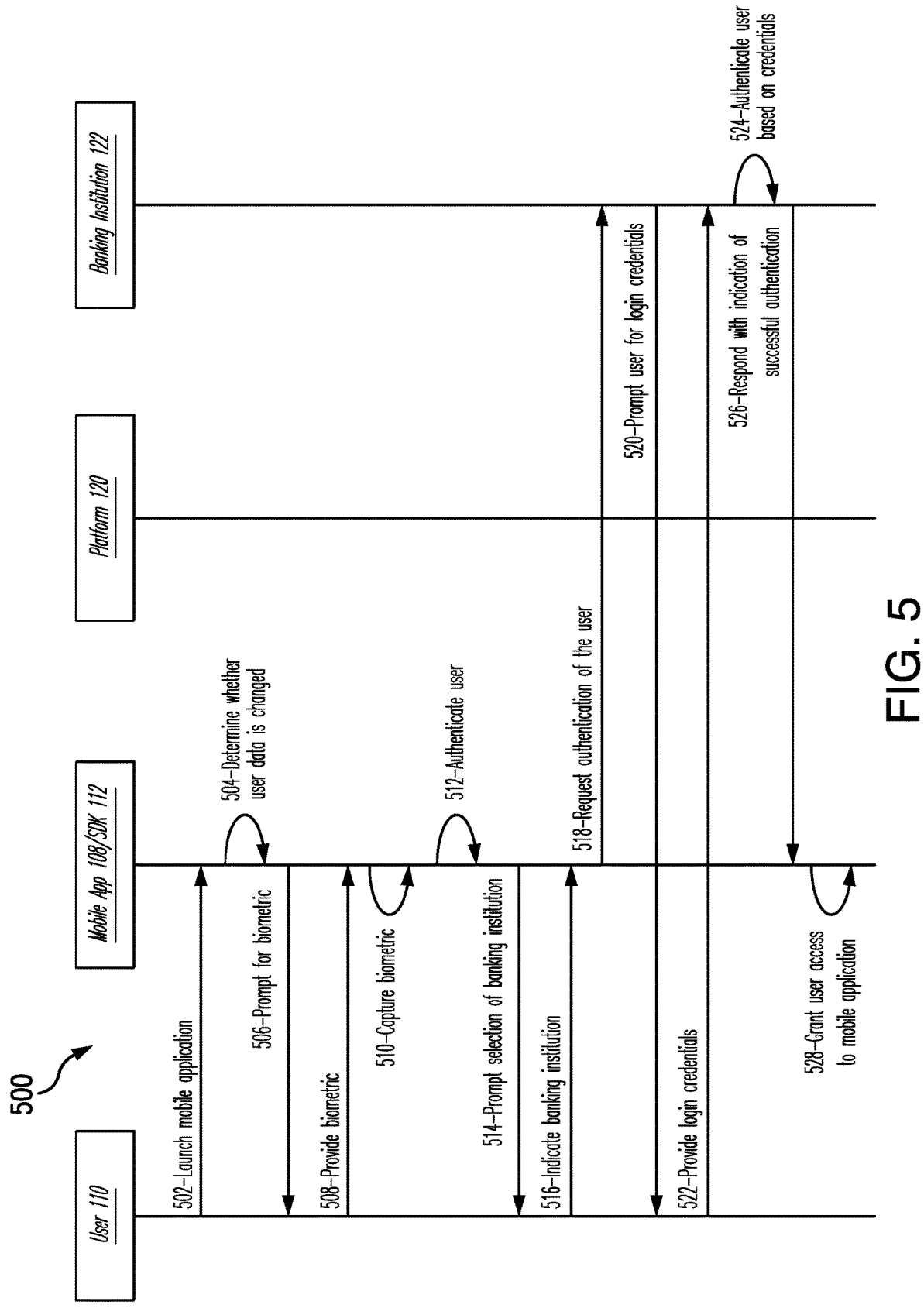

FIG. 4 illustrates an exemplary method, which may be implemented in connection with the system of FIG. 1, for use in authenticating the user in connection with a payment application; and FIG. 5 illustrates an exemplary method, which may be implemented in connection with the system of FIG. 1, for use in managing access to a digital identity for a user associated with a mobile device, when data associated with the user is changed.

Corresponding reference numerals indicate corresponding parts throughout the several views of the drawings.

DETAILED DESCRIPTION

Exemplary embodiments will now be described more fully with reference to the accompanying drawings. The description and specific examples included herein are intended for purposes of illustration only and are not intended to limit the scope of the present disclosure.

When users apply for accounts, such as, for example, banking accounts, investment accounts, payment accounts, etc., the users are often required to provide proof of their identities in connection with applying for the accounts. Once such proof is presented, and verified, the parties offering the accounts proceed to issue the accounts to the users, where the accounts then reflect certain attributes of the users' identities. Physical documents representing the users' identities as well as digital identities of the users may be relied upon for these purposes. From time to time, data associated with the users' identities may change or be changed in connection with providing a digital identity. While such changes do occur and are often legitimate, some changes may be associated with unauthorized access and/or fraudulent use of the users' identities.

With that said, in one aspect of the present disclosure, the systems and methods herein uniquely provide for binding of digital identities to mobile devices and/or mobile applications included therein. In particular herein, a mobile application is configured to capture an image of a physical document (e.g., a government ID card, etc.) associated with a user and further capture a biometric of the user (e.g., a fingerprint, a facial image, a voice sample, a palm print, an iris scan, etc.). When the biometric includes an image of the user, such image of the user is then extracted from the image of the physical document, and converted to a biometric template. The mobile application then compares the biometric template to the captured biometric. When a match is determined, the mobile application transmits a message including the image of the physical document and the biometric template to an identification provider, which verifies the biometric template against a repository of biometrics. When verified, an activation code is then transmitted to the identification provider and/or the mobile application. In response to at least the activation code, the mobile application binds the biometric template of the user into the mobile device and/or the mobile application in the mobile device, thereby activating and/or enabling the mobile application to subsequently provide a digital identity associated with the user to one or more relying parties (e.g., issuers of accounts, other parties that may rely on verifying identities of users before taking actions, etc.).

In another aspect of the present disclosure, the systems and methods herein uniquely provide for additional authentication of a user, at a mobile application (e.g., a banking application, a digital wallet application, other applications, etc.), through another institution (e.g., a banking institution, etc.), when a change in data associated with the user and his/her digital identity at the mobile application is identified. In particular, when a user changes data associated with his/her identity (e.g., a change in address, etc.), the change is noted and/or identified upon the user attempting to access his/her corresponding mobile application (with which the digital identity is associated). In turn, in response to the access attempt, the mobile application directs the user to an access interface (e.g., a login interface, etc.) associated with another institution, directly or in combination with seeking biometric authentication of the user. When the user is authenticated by the other institution, the user is returned to the mobile application and permitted to access the mobile application. In this manner, prior to accessing the mobile application (and specifically, prior to accessing function(s) and/or operation(s) thereof), the user is separately authenticated by another party who has a relationship with the user. As such, the access to the mobile application is granted only after the further authentication of the user by the other party, thereby providing enhanced fraud protection and/or protection from unauthorized access to the mobile application. In addition, reliance on the other party permits the mobile application and/or the platform associated therewith to avoid, for example, a need to provide one-time tokens or one-time passwords to the user, which have to be separately solicited and verified, to facilitate access to his/her mobile application after recognizing a change in the user's identity.

FIG. 1 illustrates an exemplary system 100 in which one or more aspects of the present disclosure may be implemented. Although the system 100 is presented in one arrangement, other embodiments may include the parts of the system 100 (or other parts) arranged otherwise depending on, for example, relationships between users and identification providers and/or third parties in the system 100, particular types of devices utilized with digital identities, particular mobile applications associated with the users, relationships between users and relying parties in the systems 100, privacy requirements, etc.

The system 100 generally includes an identification provider (IDP) 102, a repository 104, a communication device 106 including a mobile application 108, a mobile application platform 120 associated with the mobile application 108, and a banking institution 122, each of which is coupled to one or more networks to provide communication therebetween. The network(s) is/are indicated generally by arrowed lines in FIG. 1, and each may include one or more of, without limitation, a local area network (LAN), a wide area network (WAN) (e.g., the Internet, etc.), a mobile network, a virtual network, and/or another suitable public and/or private network capable of supporting communication among two or more of the parts illustrated in FIG. 1, or any combination thereof.

The IDP 102 of the system 100 generally is associated with forming and/or managing digital identities associated with users (e.g., for user 110, etc.). In connection therewith, the IDP 102 may participate in providing the digital identity for the user 110 to one or more relying parties, as required. In FIG. 1, the IDP 102 is illustrated as a standalone service and/or device of the system 100. However, the IDP 102 may additionally, or alternatively, be incorporated in whole or in part with another party in the system 100, such as, for example, a payment network, a business entity, or a banking institution, etc. Specifically, for example, the IDP 102 may be incorporated, in whole or in part, into the Mastercard® payment network and configured to operate as described herein to provide one or more identity-based services to users via and/or in association with the Mastercard® payment network. It should be appreciated that while the IDP 102 is illustrated as a single entity and/or computing device in FIG. 1, the IDP 102, may be segregated into multiple different entities and/or computing devices in other embodiments, with data being exchanged therebetween, so that the IDP 102, overall, is still configured to operate as described herein.

The repository 104 of the system 100 includes a data structure, in which one or more biometric references for each of multiple users (including the user 110) is/are stored. The repository 104, in this exemplary embodiment, is associated with one or more government entities, services and/or programs, etc., whereby the repository 104 includes biometric references for multiple users, and where the biometric references are linked to identification numbers of the users (e.g., government-issued numbers such as social security numbers, Aadhaar numbers, etc.). In one example, the repository 104 includes the Central Identities Data Repository (CIDR) associated with the Unique Identification Authority of India (UIDAI), etc. It should be understood that the repository 104 may include more or less data related to the users, whereby the biometric references may be linked to the other data related to the users (e.g., the users' names, mailing addresses, phone numbers, etc.), or not. Apart from one or more government entities, the repository 104 may also, or alternatively, be included in and/or associated with one or more private entities, such as, for example, a banking institution, a payment network, etc., while substantially remaining consistent with the description herein.

The mobile application platform 120 of the system 100 generally is configured to provide backend support for the mobile application 108, other applications, and/or various functions and/or operations provided thereby. For example, the platform 120 may be configured to form, register, and/or manage digital identities associated with users (e.g., for user 110, etc.) in association with the mobile application 108, where the digital identities involve a government ID, etc. In this manner, the platform 120 may be associated with the IDP 102. The platform 120 is illustrated in FIG. 1 as a standalone service and/or device of the system 100. However, the platform 120 may additionally, or alternatively, be incorporated in whole or in part with another entity or party in the system 100, such as, for example, a payment network, a business entity, or a banking institution (e.g., banking institution 122, etc.), etc. Specifically, for example, the platform 120 may be incorporated, in whole or in part, into the Mastercard® payment network and configured to operate as described herein to provide one or more identity-based services to users via and/or in association with the Mastercard® payment network and the mobile application 108 (where the mobile application 108 may then also be associated with and/or provided by the Mastercard® payment network (e.g., where the mobile application 108 may be associated with the Masterpass digital wallet, etc.)). It should be appreciated that the mobile application platform 120 may yet another different entity, whereby the mobile application 108 is consistent with the description herein, but is further associated with additional functionalities (e.g., unrelated to digital identities and/or banking, etc.)

It should be appreciated that while the mobile application platform 120 is illustrated as a single entity and/or computing device in FIG. 1, the platform 120 may be segregated into multiple different entities and/or computing devices in other embodiments, with data being exchanged therebetween. However, even in such embodiments, the mobile application platform 120, overall, is still generally configured to operate as described herein. It should also be appreciated that the mobile application 108, and by extension the mobile application platform 120, may relate to various different subject matter, and is not necessarily limited to payment applications and/or digital wallets.

As further shown in FIG. 1, the banking institution 122 of the system 100 includes a company, a business or another entity through which the user 110 is able to transfer, hold and/or manage financials, etc. With that said, the banking institution 122, in general, provides or issues an account to the user 110, for example, through which the user 110 is able to hold funds, transfers funds to/from other accounts, etc. That said, the account need not be a financial or payment account.

In addition, the banking institution 122 is associated with a network-based application (e.g., a website, mobile application, etc.) available to the user 110, for example, via a computing device, and through which the user 110 is able to access his/her account to, for example, view balances, transfer funds, pay bills, and perform other suitable tasks associated with the banking institution 122, etc. The network-based application is hosted by the banking institution 122 (at a computing device 200 included therein) (or by another computing device on behalf of the banking institution 122). The network-based application is configured to require authentication of the user 110, prior to permitting such access and/or functionality. In connection therewith, the authentication may rely on knowledge, ownership and/or inherent factors associated with the user 110, such as, for examples, usernames, passwords, biometrics (e.g., fingerprints, retinal patterns, palm prints, etc.), personal identification numbers (PINs), keys, security tokens, cards, challenge questions/responses, etc. In this example, only after the user 110 is authenticated to the network-based application, through one or more such factors, is the user 110 then permitted to utilize in one way, or another, the network-based application. With that said, the network-based application associated with the banking institution 122 may be associated with the mobile application 108, or may be separate therefrom.

While the banking institution 122 is specifically described as a banking institution in this example embodiment, other types of institutions may be included in other system embodiments that are unrelated to banking services. For example, the banking institution 122 may include any other type of institution that authenticates users associated with products and/or services offered by the institution (e.g., insurance, telecommunications, entertainment, investments, education, health services, email/communication, etc.). As such, the institution may include a business, a merchant, a retailer, a service provider (e.g., a healthcare provider, etc.), or another entity (which is not a banking institution) that interacts with users, whereby user authentication is relied upon for granting access to users to one or more accounts through network-based applications (e.g., websites, mobile applications, etc.) associated with the institution (e.g., purchase accounts, email accounts, health accounts, insurance accounts, telecommunication accounts, entertainment accounts, investment accounts, etc.).

With continued reference to FIG. 1, the communication device 106 of the system 100 includes the mobile application 108 (or mobile app), which is configured to interact with the IDP 102 and the platform 120. The mobile application 108 itself may include any application providing a variety of functions, which may be associated or unassociated with a digital identity, the repository 104, etc. (e.g., including, for example, the network-based application provided by the banking institution 122, etc.). The mobile application 108 may also relate specifically to digital identification, or it may relate and/or be integrated with one or more other services and/or functions (e.g., mobile banking, virtual wallets, utilities, medical records, user accounts, email, etc.), or not. The mobile application 108 may be provided by, without limitation, the banking institution 122, a services provider (e.g., a utility provider, a medical provider, etc.), etc.

What's more, in this exemplary embodiment, the mobile application 108 further includes a software development kit (SDK) 112. The SDK 112 is provided by and/or associated with the IDP 102 and/or the platform 120 and configures the communication device 106 and the mobile application 108 to interact with the IDP 102 and the platform 120, as it relates to user authentication generally, as described herein. As an example, the mobile application 108 may be associated with the UIDAI, which as described above is associated with the repository 104 (and is a repository of biometrics associated with users), and the SDK 112 may be associated with the IDP 102 and/or the platform 120, which, as described above, may be provided in whole or in part in the Mastercard® payment network. As another example, the mobile application 108 may be associated with a virtual wallet (e.g., the Masterpass digital wallet from Mastercard®, etc.), including a library of reference biometrics of users associated therewith. As still another example, the SDK 112 may be provided in connection with and/or associated with a government entity, such as, for example, the UIDAI, which as described above is then associated with the repository 104. In general, the SDK 112 is provided to a developer of the mobile application 108 (from a different entity (e.g., the IDP 102, the platform 120, etc.) for inclusion in the mobile application 108 to provide the operation described herein. The SDK 112 includes a public key for and/or certificate when included in the mobile application 108, compiled, downloaded to the communication device 106, and/or activated.

The communication device 106 is associated with the user 110 who, in turn, is associated with an identity. The identity of the user 110 is evidenced by one or more physical documents, such as physical document 114 (shown as a government identification card issued by a state, regional, or federal government). With that said, it should be appreciated that additional and/or other physical documents for the user 110 may be included in the system 100 and relied upon herein, such as, for example, a passport, a government issued ID, a social security card, a health insurance card, a bank statement, an employee ID, a utility bill, etc., generally, which includes a biometric, such as a facial image for the user 110, etc. The physical document 114 (and other physical documents potentially included in the system 100) then includes details of the user 110 and/or of the identity of the user 110, which distinguishes the user 110, alone or in combination, from one or more other users. The details may include the user's name, mailing address, birthdate, contact information (e.g., a phone number, an email address, etc.), government identifiers/numbers, gender, country of origin, height, eye color, weight, etc.

Further in the system 100, the communication device 106 includes a pay application (or Pay App) 116, which also includes an SDK 118. The pay application 116 configures (and enables) the communication device 106 to operate as (and to be used as) a payment device, whereby in connection with a purchase transaction the communication device 106 is configured to provide payment account credentials for a payment account issued to the user 110. In this manner, the pay application 116 may be considered and/or may be consistent with a virtual wallet and/or an e-wallet application. That said, the SDK 118 is associated with and/or provided by the banking institution 122 (or another banking institution and/or by a payment network) (associated with the payment account to be used) to configure the communication device 106 to interact therewith, for example, when using the pay application 116, etc. In at least one embodiment, the IDP 102 and the platform 120 are included and/or associated with a payment network, and the pay application 116 is supported by the same payment network, whereby each of the SDK 112 and the SDK 118 is provided by the single payment network to configure the communication device 106 to interact therewith, as described herein and illustrated in the system 100 of FIG. 1.

While only one identification provider 102, one repository 104, one communication device 106, one mobile application 108, one user 110, one platform 120, and one banking institution 122 are illustrated in the system 100, it should be appreciated that additional ones of these parts may be included in other system embodiments. What's more, banking institution(s) and/or a payment network may include one or more of the parts illustrated in the system 100 of FIG. 1.

Figure 2:
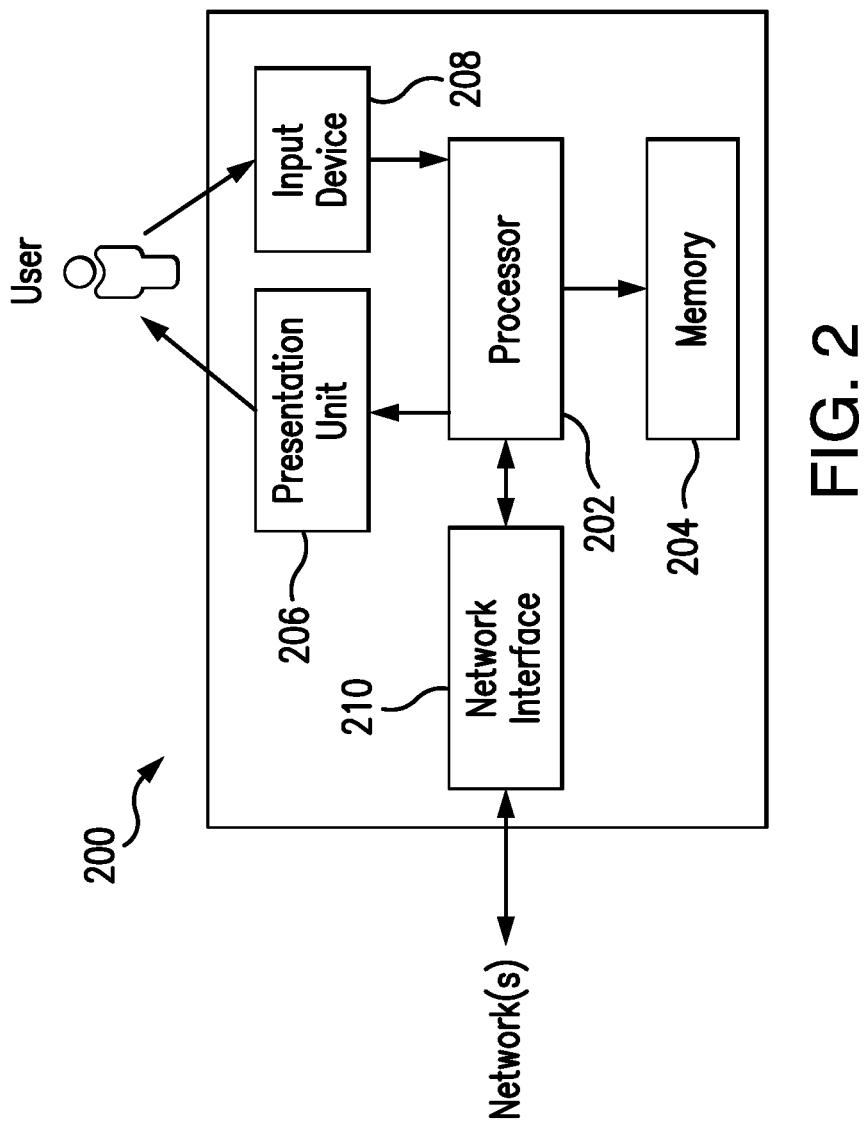
FIG. 2 is a block diagram of a computing device that may be used in the exemplary system of FIG. 1.

FIG. 2 illustrates an exemplary computing device 200 that can be used in the system 100 of FIG. 1. The computing device 200 may include, for example, one or more servers, workstations, personal computers, laptops, tablets, smartphones, etc. In addition, the computing device 200 may include a single computing device, or it may include multiple computing devices located in close proximity or distributed over a geographic region, so long as the computing devices are specifically configured to function as described herein. In the exemplary embodiment of FIG. 1, each of the IDP 102, the repository 104, the mobile application platform 120, and the banking institution 122 is illustrated as including, or being implemented in, computing device 200, coupled to (and in communication with) one or more of the networks. In addition, the communication device 106 is also considered a computing device generally consistent with computing device 200 for purposes of the description herein. However, the system 100 should not be considered to be limited to the computing device 200, as described below, as different computing devices and/or arrangements of computing devices may be used in other embodiments. In addition, different components and/or arrangements of components may be used in other computing devices.

Referring to FIG. 2, the exemplary computing device 200 includes a processor 202 and a memory 204 coupled to (and in communication with) the processor 202. The processor 202 may include one or more processing units (e.g., in a multi-core configuration, etc.). For example, the processor 202 may include, without limitation, a central processing unit (CPU), a microcontroller, a reduced instruction set computer (RISC) processor, an application specific integrated circuit (ASIC), a programmable logic device (PLD), a gate array, and/or any other circuit or processor capable of the functions described herein.

The memory 204, as described herein, is one or more devices that permit data, instructions, etc., to be stored therein and retrieved therefrom. The memory 204 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable media. The memory 204 may be configured to store, without limitation, identity details and data related to identities of users, digital identities, certificates, key pairs, captured biometrics, reference biometrics, activation codes, authentication credentials, and/or other types of data (and/or data structures) suitable for use as described herein. Furthermore, in various embodiments, computer-executable instructions (e.g., in the form of the mobile application 108 and/or the SDK 112, or the pay application 116 and/or the SDK 118, etc.) may be stored in the memory 204 for execution by the processor 202 to cause the processor 202 to perform one or more of the functions described herein, such that the memory 204 is a physical, tangible, and non-transitory computer readable storage media. Such instructions often improve the efficiencies and/or performance of the processor 202 and/or other computer system components configured to perform one or more of the various operations herein. It should be appreciated that the memory 204 may include a variety of different memories, each implemented in one or more of the functions or processes described herein.

In the exemplary embodiment, the computing device 200 also includes a presentation unit 206 that is coupled to (and is in communication with) the processor 202 (however, it should be appreciated that the computing device 200 could include output devices other than the presentation unit 206, etc.). The presentation unit 206 outputs information, visually or audibly, for example, to a user of the computing device 200 (e.g., prompts to the user 110 at the communication device 106 to capture a biometric, etc.), etc. And various interfaces (e.g., as defined by the mobile application 108 and/or the SDK 112, or the pay application 116 and/or the SDK 118, etc.) (e.g., including instructions to capture an image of a document, etc.) may be displayed at computing device 200, and in particular at presentation unit 206, to display certain information in connection therewith. The presentation unit 206 may include, without limitation, a liquid crystal display (LCD), a light-emitting diode (LED) display, an organic LED (OLED) display, an "electronic ink" display, speakers, etc. In some embodiments, the presentation unit 206 may include multiple devices.

In addition, the computing device 200 includes an input device 208 that receives inputs from the user (i.e., user inputs) of the computing device 200 such as, for example, images of documents, biometrics, etc., in response to prompts from the mobile application 108 (and/or the SDK 112, or the pay application 116 and/or the SDK 118, etc.), as further described below. The input device 208 may include a single input device or multiple input devices. The input device 208 is coupled to (and is in communication with) the processor 202 and may include, for example, one or more of a keyboard, a pointing device, a mouse, a stylus, a camera, a touch sensitive panel (e.g., a touch pad or a touch screen, etc.), another computing device, and/or an audio input device. In various exemplary embodiments, a touch screen, such as that included in a tablet, a smartphone, or similar device, may behave as both the presentation unit 206 and an input device 208.

Further, the illustrated computing device 200 also includes a network interface 210 coupled to (and in communication with) the processor 202 and the memory 204. The network interface 210 may include, without limitation, a wired network adapter, a wireless network adapter (e.g., an NFC adapter, a Bluetooth™ adapter, etc.), a mobile network adapter, or other device capable of communicating to one or more different ones of the networks herein and/or with other devices described herein. Further, in some exemplary embodiments, the computing device 200 may include the processor 202 and one or more network interfaces incorporated into or with the processor 202.

Referring again to FIG. 1, in use of the system 100, the user 110 initially downloads and installs the mobile application 108 to the communication device 106. Upon installation, the communication device 106 is configured, by the mobile application 108 and/or the SDK 112, to interact with the IDP 102, as described below, or separately to notify the IDP 102 of the potential registration of the user 110 and/or the mobile application 108. In response, the IDP 102 is configured to issue a registration challenge, which includes a random cryptographic challenge (e.g., a randomly generated number, etc.), to the mobile application 108, immediately or within a duration of the notification from the communication device 106. The random cryptographic challenge, in this example, provides a limited use number, which inhibits an intermediary, who intercepts the challenge (for fraudulent or unauthorized purposes), from being able to use the challenge in connection with one or more registration processes.

When the user 110 decides to register with the IDP 102, the communication device 106 is configured, again by the mobile application 108 and/or the SDK 112, to prompt the user 110 to present the physical document 114 to the communication device 106 and then to capture an image of the physical document 114. In connection therewith, the communication device 106 is configured to check integrity of the physical document 114 and/or the captured image of the physical document (e.g., to detect altered physical documents (e.g., replacing a facial image of the document holder with a facial image of a fraudster, etc.), etc.). Next, the communication device 106 is configured, by the mobile application 108 and/or the SDK 112, to prompt the user 110 to present a biometric to the communication device 106. The biometric may include any biometric that is included in the physical document 114, including, for example, a facial image, an iris scan, a fingerprint, or a combination thereof, etc. In turn, the communication device 106 is configured, by the mobile application 108 and/or the SDK 112, to capture the biometric (or, potentially, multiple biometrics) from the user 110. In the meantime, or before or after, the communication device 106 is configured, by the mobile application 108 and/or the SDK 112, to extract an image of the user 110 or other biometric from the captured image of the physical document 114 and to convert the same to a biometric template. Finally in this process, the communication device 106 is configured, by the mobile application 108 and/or the SDK 112, to compare the biometric template (as generated based on the captured image of the physical document 114) to the captured biometric of the user 110, thereby verifying the user 110 against the physical document 114.

If the captured biometric of the user 110 matches the biometric template (e.g., within conventional thresholds, etc.), the communication device 106 is configured, by the SDK 112, to generate a public-private key pair (including a public key and a private key). Then, the communication device 106 is configured, by the mobile application 108 and/or the SDK 112, to transmit the public key to the IDP 102, alone or in combination with one or more other messages, while the private key is maintained at the mobile application 108.

Thereafter, the communication device 106 is configured, by the mobile application 108 and/or the SDK 112, to compile a message including the image of the physical document 114 and the biometric template, encrypt the message with a public key included in the SDK 112 and known to the IDP 102 (thereby providing additional encryption in addition to transport layer security (TLS) between the communication device 106 and the IDP 102), and then transmit the encrypted message to the IDP 102. Upon receipt, the IDP 102 is configured to decrypt the message, using its private key, and to transmit the message to the repository 104 (thereby requesting the repository 104 to verify the biometric template against a biometric reference included in the repository 104). In response, the repository 104 is configured to retrieve a biometric reference for the user 110, from memory 204 of the repository 104, based on an identification number associated with the user 110 and included in the message, or included in the image of the physical document 114, or otherwise, and to compare the biometric reference and biometric template referenced in the message.

When the comparison of the biometric reference and biometric template referenced in the message indicates a match, the repository 104 is configured to respond to the IDP 102 with an activation code for the mobile application 108 (which may be encrypted with a private key of the repository 104, or not). The activation code may include, for example, a one-time use activation code, a multi-use activation code, etc. In general, the activation code is a signed result, which may be provided in any form and which may include (or not include) various data. In one example, the activation code or signed result may indicate personal identifying information (PII) about the user 110, while in other examples, the signed result may include a description of the type of authentication completed or an assertion required and/or request by the mobile application 108 (or entity associated therewith), etc. The IDP 102 is configured, upon receipt of the activation code, to transmit the activation code to the mobile application 108. In connection therewith, the IDP 102 is configured to encrypt the activation code, prior to transmitting an encrypted message (including the activation code) to the mobile application 108, based on the public key for the communication device 106. Also, the IDP 102 is configured to record or otherwise store the activation code, or an indication thereof, in memory 204 therein, and to recognize the mobile application 108 and/or the communication device 106 as registered, such that one or more subsequent registration challenges from the IDP 102 are avoided or otherwise not issued.

Finally, the communication device 106 is configured, by the mobile application 108 and/or the SDK 112, to receive the message from the IDP 102, to decrypt the message based on its private key, to verify the message (or activation code included in the message) based on a public key of the IDP 102 and/or the public key from the repository 104, and to cryptographically bind data representative of the mobile application 108, user biometric (e.g., the biometric template, etc.), and the communication device 106 into a token. In particular, the token is compiled and specific to the communication device 106, the mobile application 108, and the user 110 (via the biometric template), whereby it is not usable with another device or application or user. Thereafter, the communication device 106 is configured, by the mobile application 108 and/or the SDK 112, to securely store the token in the memory 204 of the communication device 106, for example, in a trusted execution environment (TEE) of the communication device 106, etc. Additionally, it should be appreciated that in connection with storing the token, the mobile application 108 may further communicate with a backend of the mobile application 108 (e.g., the platform 120, the banking institution 122, another entity, etc.) to send and/or receive an activation code or other suitable code to further activate and/or register the mobile application 108 in connection with the operations herein.

When the token is stored, the mobile application 108, and the communication device 106, more broadly, is enabled to provide a digital identity associated with the user 110 to one or more relying parties, for example, upon request and local authentication of the user 110 (based on the biometric). That is, when authentication is required, for the mobile application 108 or in connection with another application relying on the mobile application 108, the presence of the token (and absence of a change to the digital identity of the user 110) permits local authentication of the user 110, using the biometric template included in the token, in place of biometric authentication through and/or involving the repository 104.

When a change does exist to the digital identity of the user 110, the communication device 106 is configured to either delete the token and repeat the operations described above, or otherwise authenticate the user 110. As to the later, in connection with use of the mobile application 108 by the user 110, the communication device is configured, by the mobile application 108 and/or the SDK 112, to determine if any of the identity data associated with the user 110 (and included in the digital identity at the communication device 106) has changed (e.g., since a prior access by the user 110 of the mobile application 108, etc.). In addition, and regardless of existence of such a change, the communication device 106 is also configured, by the mobile application 108 and/or the SDK 112, to solicit a biometric or other login credential for the mobile application 108 from the user 110 and, upon receipt of the biometric and/or login credential, to authenticate the user 110 (either locally at the communication device 106 or remotely, for example, via the UIDAI; etc.) (prior to operations below, in this embodiment, further and/or certain access to the mobile application, etc.).

When the communication device 106 identifies and/or determines that no change exists to any of the user's identity data (broadly, digital identity), and when the user 110 is authenticated, the communication device 106 is configured, by the mobile application 108 and/or the SDK 112, to provide access to the user 110 to the operations available through the mobile application 108. For example, the mobile application 108 may be employed by the user 110 to provide a digital identity to a relying party in connection with a business transaction, opening of an account, attempting to gain access to a place and/or mode of transportation, etc. Or, the mobile application 108 may be employed by the user 110 to perform regular operations associated therewith (e.g., to facilitate payment for a good/service where the mobile application includes a virtual wallet application, etc.).

However, when the communication device 106 identifies and/or determines a change to the user's identity data, the communication device 106 is configured, by the mobile application 108 and/or the SDK 112, to further solicit an input from the user 110 of another institution for which the user 110 also has access (or login) credentials, for example, the banking institution 122 (or other third party). In response, in the exemplary embodiment, the user 110 selects the banking institution 122 (e.g., from a pre-populated list of available selections based on a setup of the mobile application 108 by the user 110, based on an instruction by the user 110 to access the banking institution 122, etc.). Upon the selection or other user input indicative of the banking institution 122, the communication device 106 is configured, by the mobile application 108 and/or the SDK 112, to direct the user 110 to an authentication server (e.g., the computing device 200, etc.) of the banking institution 122. In general, the communication device 106 is configured, by the mobile application 108 and/or the SDK 112 (or the OS of the communication device 106), to coordinate authentication of the user 110 with the authentication server of the banking institution 122 (e.g., through exchange of login credentials, biometric, authorization codes, ID tokens, access token, etc. In connection therewith, the communication device 106 is configured, by the mobile application 108 and/or the SDK 112 (or the OS of the communication device 106), to call, direct or otherwise cause to be displayed an authentication interface associated with, hosted by, or designated by the banking institution 122. The interface may be called, for example, via an application programming interface (API) or otherwise (e.g., an openID connect API or similar call, etc.). In general, though, the authentication interface provided by the banking institution 122 solicits access credentials for the user 110 which correspond to a network-based application provided for/by the banking institution (e.g., for the user's account at the banking institution 122 via the banking institution's bank account access website, etc.).

In response, the user 110 provides the access credentials to the authentication interface and, thus, to the banking institution 122. And, in turn, the banking institution 122 (through its network-based application) is configured to authenticate the user 110 based on the provided access credentials and to notify the communication device 106 and/or mobile application 108 when the user 110 is authenticated (e.g., via an authorization code, etc.). When the user 110 is successfully authenticated, the user 110 is re-directed to the mobile application 108, in which the user 110 is provided with access to the operations available through the mobile application 108, for example, as described above. In connection therewith, the communication device 106 may be configured, by the mobile application 108 and/or the SDK 112 (or the OS of the communication device 106), to verify authentication of the user (e.g., via the authorization code, or related token, etc.) with the authentication server of the banking institution 122, prior to grating access to the one or more services and/or functions of the mobile application.

In another exemplary embodiment, a system may include at least one mobile communication device and an identification provider computing device in communication with the at least one mobile communication device and with a biometric repository. In this embodiment, the identification provider computing device may be configured to: (a) receive a message from the at least one mobile communication device, the message including an image of a physical document and a biometric template for a user associated with the at least one mobile communication device; (b) transmit the message, or part thereof, to the biometric repository, thereby requesting the biometric repository to verify the biometric template against a biometric reference for the user included in the repository; and/or (c) transmit an activation code for a mobile application in the at least one communication device, when the repository verifies the biometric template, thereby permitting the mobile application in the at least one communication device to bind the mobile application, the at least one mobile communications device, and the biometric template for the user in association with a digital identity for the user at the mobile communications device.

Further in this embodiment, the identification provider computing device may also be configured to decrypt the message received from the at least one mobile communication device using a private key stored in a memory of the identification provider computing device, issue a registration challenge to the mobile application where the message is from the at least one mobile communication device and is received in response to the registration challenge; and/or record the activation code, or an indication of the activation code, in the memory of the identification provider computing device whereby one or more subsequent registration challenges are avoided.

Figure 3:
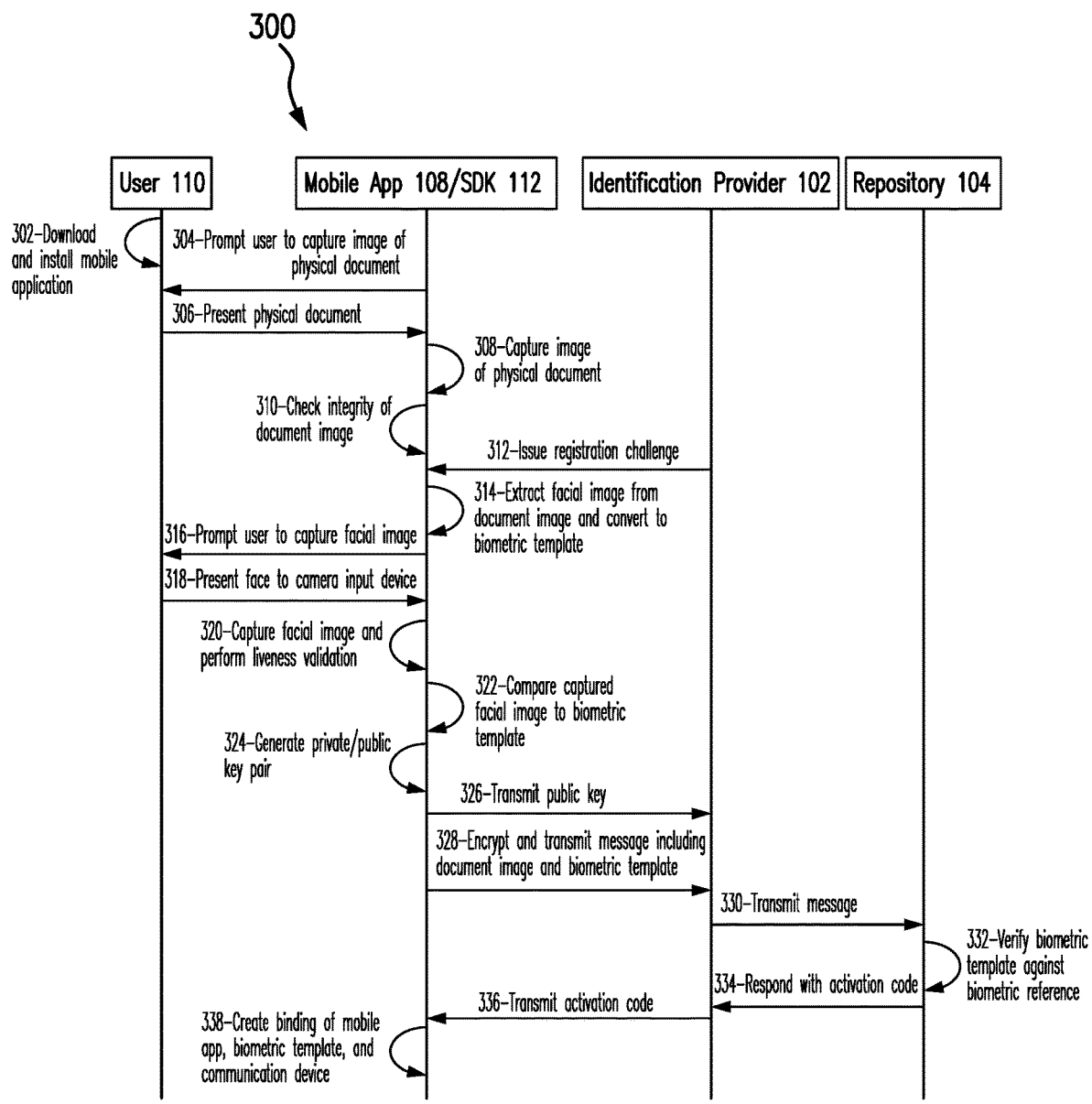
FIG. 3 illustrates an exemplary method, which may be implemented in connection with the system of FIG. 1, for use in enabling and providing a digital identity associated with a mobile device through verification of at least one physical document and/or biometric against a repository.

FIG. 3 illustrates an exemplary method 300 for use in providing biometric identities in association with mobile devices, through verification of at least one physical document and/or biometric against a repository. The exemplary method 300 is described as implemented in the IDP 102, the repository 104, the communication device 106, the mobile application 108, and/or SDK 112 of the system 100. Reference is also made to the computing device 200. However, the methods herein should not be understood to be limited to the system 100 or the computing device 200, as the methods may be implemented in other systems and/or computing devices. Likewise, the systems and the computing devices herein should not be understood to be limited to the exemplary method 300.

At the outset in the method 300, the user 110 downloads and installs, at 302, the mobile application 108 to the communication device 106. Upon installation, the mobile application 108 (alone or via the SDK 112) prompts, at 304, the user 110 to present a physical document, and in particular in this example, the government ID card physical document 114, to the communication device 106. In response, the user 110 presents, at 306, the physical document 114 to the communication device 106, and specifically in this example, to a camera input device 208 of the communication device 106. Thereafter, the mobile application 108 automatically, or in response to an input from the user 110, captures an image of the physical document 114, at 308.

Upon capturing the image of the physical document 114, the mobile application 108 checks, at 310, the integrity of the image of the physical document 114. This is performed locally at the communication device 106 in this embodiment, but may be performed remotely, in whole or in part, in other embodiments. The integrity check is performed consistent with conventional processes to determine if the document image includes a genuine document, or if the image includes a potentially fraudulent and/or fake reproduction of a genuine document (e.g., a legitimate document with a different user's image taped, glued, or otherwise positioned over an image included in the legitimate document, etc.). What's more, the integrity check is also performed to make sure the physical document 114 is consistent with the form of the alleged document, including, without limitation, a check that the physical document 114 includes expected information in the expected locations and/or otherwise meets requirements of the specific document. The degree of integrity checking required and/or performed may be different in other embodiments depending, for example, on the particular implementation of the method 300, types of potential relying parties, etc.

Once the integrity of the document in the image is confirmed (or the image is determined not to be fraudulent/fake), or prior, the IDP 102 issues, at 312, a registration challenge for the user 110, which is provided to the mobile application 108. The registration challenge may be a response, from the IDP 102, to the installation of the mobile application 108 or to other activities of the mobile application 108 in connection with capturing and/or verifying a physical document for the user. For example, the mobile application 108 may notify the IDP 102, via the communication device 106, upon installation or upon capture of the image of the physical document 114, whereupon the IDP 102 logs the instance/installation in memory (e.g., the memory 204, etc.), and responds by issuing the registration challenge. In at least one embodiment, the IDP 102 omits the registration challenge, thereby relying on the mobile application 108 and/or the SDK 112 to continue with the method 300.

In response to the registration challenge, or not, the mobile application 108 extracts a facial image (e.g., a photo of the user 110, etc.) from the captured image of the physical document 114 and coverts the extracted facial image to a biometric template, at 314. The biometric template includes, for example, a numeric representation of the extracted facial image, which is suitable for comparison to subsequently captured biometrics.

At 316, then, the mobile application 108 prompts the user 110 to present his/her face to the communication device 106, so that an image of the user's face (broadly, a biometric) may be captured. In response, the user 110 presents his/her face to camera input device 208 of the communication device 106, at 318 (and selects a button to indicate the same to the mobile application 108), and then, at 320, the mobile application 108, via the camera input device 208, captures an image of the user's face (broadly, the biometric). In connection therewith, or separate therefrom, the mobile application 108 further, at 320, performs a liveness validation of the face of the user 110, such that if a still photo of the user 110 would be detected (i.e., if the captured image is of a photo of a person rather than an actual person), the process would be halted (e.g., by measuring temperature, curvature, texture, etc.). In this manner, the mobile application 108 inhibits a still photo or other representation of the user's face from being used in lieu of the user's actual face (e.g., the mobile application 108 confirms that the captured biometric is from a living person and not from an image of the biometric, etc.). If the liveness validation succeeds, the mobile application 108 then compares, at 322, the captured image of the user's face (broadly, the biometric) to the biometric template generated from the physical document 114.

When the captured image of the user's face matches the biometric template, the mobile application 108 generates a public-private key pair, at 324, for use in communication with the IDP 102. The mobile application 108 then transmits, at 326, the public key to the IDP 102, alone or in combination with one or more other messages. The private key from the key pair is also stored, by the mobile application 108 (or SDK 112) in memory of the communication device 106 (e.g., the memory 204, etc.). It should be understood that in addition to the generated private key, the mobile application 108 (and specifically, the SDK 112) further includes a public key from the IDP 102 to be used as described below.

Thereafter, the mobile application 108 compiles a message including the image of the physical document 114 and the biometric template for the user 110, encrypts the message with the public key of the IDP 102, and then transmits the message (i.e., the encrypted message) to the IDP 102, at 328. It should be appreciated that a certificate for the communication device 106 may also be included with and/or in the message, where the certificate (including the mobile application's public key) is included, potentially, along with identifying information associated with the communication device 106, the user 110, and/or the mobile application 108 (including the SDK 112). It should also be appreciated that the particular identifying information to be included may vary depending on the particular implementation, a type of the IDP 102, a type of the repository 104, etc. For example, the message may include an identification number for the user 110 (e.g., an Aadhaar number, etc.), which is either extracted from the image of the physical document 114 (e.g., where the physical document includes the identification number, etc.) or is solicited from and provided by the user 110, whereby the biometric of the user 110 may be validated at the repository 104. In any case, upon receipt of the message, the IDP 102 decrypts the message with its private key and then transmits, at 330, the decrypted message (or parts thereof) to the repository 104.

The repository 104, in turn, identifies a biometric reference for the user 110, based on the identification number included in the message and/or in the image of the physical document 114, and then compares, at 332, the identified biometric reference to the biometric template referenced in the message. When the comparison indicates a match, the repository 104 responds to the IDP 102, at 334, with an activation code or other signed result (e.g., assertion, confirmation, etc.) for the mobile application 108. Alternatively, when there is a match, the repository 104 may merely confirm the match to the IDP 102, whereupon it is the IDP 102 that issues the activation code for the mobile application 108. In either event, the IDP 102 transmits the activation code to the mobile application 108, at 336. In one example, the IDP 102 may encrypt the activation code (or a message including the activation code) based on the public key of the mobile application 108, and transmit the encrypted message to the mobile application 108. In addition, the IDP 102 records or otherwise stores the activation code, or an indication thereof, in memory (e.g., the memory 204, etc.), whereby one or more subsequent registration challenges from the IDP 102 to the mobile application 108 are avoided or otherwise not issued at 312, for subsequent interactions therebetween.

Finally in the method 300, the mobile application 108 receives the message from the IDP 102 and decrypts the message based on its private key. Then, based on the activation code or signed result, the mobile application 108 binds, at 338, the mobile application 108, the user's biometric, and the communication device 106 into a token and stores the token in memory therein (e.g., in a TEE, etc.). Here, the binding of the data into the token may be, for example, cryptographically based. Regardless, however, the token is specific to the user 110, the communication device 106 and mobile application 108, and thus inaccessible and/or unusable with a different user, device or application.

What's more, the mobile application 108 and/or the SDK 112 may continually check to determine if any identity data of the user 110 (e.g., a biometric template, a government ID number, an Aadhaar Card availability, an address, a phone number, etc.) has changed based on a user interface at the mobile application 108 and information provided thereto. For example, where the user 110 attempts to change an address or telephone number, or other personal identifying information, when such a change is detected or identified, the mobile application 108 and/or the SDK 112 may delete or otherwise remove the token bound into the communication device 106 and employ (or reemploy) the method 300, or one or more parts thereof, to generate a new token for the mobile application 108, or merely halt use of the mobile application and employ the method 300, or parts thereof, to recertify and/or re-establish the digital identity of the user 110 through the IDP 102 and/or the repository 104. Additionally, or alternatively, the method 500 (below) may be employed to further authenticate the user 110 with another entity, when such a change in identity data of the user 110 is determined (rather than deleting the token or repeating one or more parts of method 300). It should be appreciated that other factors may cause the method 300 or parts thereof to be repeated to ensure that the digital identity bound into the communication device 106 is up to date and accurate for the user 110.

FIG. 4 illustrates an exemplary method 400 for use in authenticating a user to a pay application. The exemplary method 400 is described as implemented in the communication device 106, the mobile application 108, and the pay application 116 of the system 100. Reference is also made to the computing device 200. However, the methods herein should not be understood to be limited to the system 100 or the computing device 200, as the methods may be implemented in other systems and/or computing devices. Likewise, the systems and the computing devices herein should not be understood to be limited to the exemplary method 400.

At 402, the user 110 initially downloads and installs the pay application 116 in the communication device 106. In this description, it should be understood that the mobile application 108 is already installed and active in the communication device 106 (with a token bound therein). As shown above, the pay application 116 includes the SDK 118.

After installation, the pay application 116, and specifically, the SDK 118, prompts, at 404, the user 110 to select to login through the mobile application 108. Upon such a selection, the mobile application 108 is launched and/or otherwise invoked, by the pay application 116 and/or the user 110. The mobile application 108, and specifically, the SDK 112 associated therewith, then determines, at 406, whether identity data of the user 110 (e.g., a biometric template, a government ID number, an Aadhaar Card availability, an address, a phone number, etc.) has changed (e.g., since a prior login, etc.). If a change is determined, the access process for the pay application 116 ends and/or the communication device 106 (and/or mobile application 108) seeks further authentication of the user 110 (e.g., from a third party, etc.) prior to proceeding further (e.g., prior to allowing the user 110 to access the pay application 116, etc.).

When no changes are determined, the SDK 112 prompts the user 110 for biometric authentication, at 408. In response, at 410, the user 110 presents a biometric to the communication device 106 (e.g., directs the camera input device 208 of the communication device 106 to the face of the user 110 (and selects an input to indicate the facial image is ready to be captured), etc.). The mobile application 108 and/or the SDK 112 then capture the biometric, via the camera input device 208 of the communication device 106, and compare the captured biometric to a biometric template for the user 110 from the token included therein and bound to the communication device 106. In doing so, when a match is found or determined, the mobile application 108 and/or SDK 112 authenticate, at 412, the user 110. And, when the user 110 is successfully authenticated, the SDK 112 generates and transmits, at 414, a federated token to the pay application 116. In response, the pay application 116, and specifically the SDK 118, receive the federated token and validate the federated token, at 416, as being properly signed (e.g., by the IDP 102, or other entity associated with the IDP 102, or other suitable entity (e.g., associated with the mobile application 108 and/or the pay application 116, etc.). Upon such validation, the user 110 is logged into the pay application 116, at 418, and registration data for the user 110, the pay application 116, the mobile application 108, etc., is transmitted, at 420, to a backend associated with the pay application 116 (e.g., a wallet platform, a payment network, etc.), to support payment transactions and other requests by the pay application 116. The federated token is generally used to verify the authentication of the user 110, whereby the federated token may be maintained within the communication device 106 and/or transmitted along with the messaging related to the payment transaction of other associated requests. In connection with validation of the federated token, however, the pay application 116 is activated, at 422, for use in such payment transactions and interactions.

As a variation (or extension) to the specific description of method 400, the user 110 may further add a payment account and/or card to the pay application 116. To do so, the user 110 opens and/or accesses the pay application 116 and logs in via the mobile application 108, through which the user 110 is authenticated (e.g., through the token for the mobile application 108, via the biometric template and a facial image of the user as in 408-412, etc.). Thereafter, as above, the SDK 112 determines, at 406, whether identity data of the user 110 (e.g., a biometric template, a government ID number, an Aadhaar Card availability, an address, a phone number, etc.) has changed (e.g., since a prior login, through inputs supplied to a user interface associated with the pay application 116, etc.). When no changes are determined, the user 110 is prompted, by the pay application 116, to capture an image of a payment device associated with the payment account to be added (e.g., a credit card, etc.). In turn, when the payment device is presented to the communication device 106 or in response to a user input to the communication device 106, the pay application 116 and specifically the communication device 106 captures an image of the desired payment device. In addition, the pay application 116 may optionally prompt the user 110 to select and/or enter a name (or other identifier) for an issuer of the user's payment account, in response to which the user 110 provides the requested information.

In connection therewith, when a government ID number for the user 110 is already linked with the identified issuer (as determined by the backend for the pay application 116, for example), the pay application 116 and/or the SDK 118 interacts with a payment network and/or backend for the pay application 116 to tokenize the identified payment account into the pay application 116, whereby the payment account is provisioned to the pay application 116. The payment account is then active in the pay application 116, and useable to fund payment transactions.

In another variation (or extension) of the method 400, the user 110 may extend authentication to the pay application 116 for face-to-face (F2F) contactless transactions. To do so, the user 110 again opens and/or accesses the pay application 116 and logs in via the mobile application 108. Thereafter, the pay application 116 and/or SDK 118 determines whether an amount of a transaction performed via the pay application 116 is less than (or equal to) a defined threshold for the specific payment account, pay application 116, and/or user 110. When the amount is less than (or equal to the threshold, the user 110 may optionally be authenticated locally by the pay application 116 (e.g., based on one or more biometrics stored in the communication device 106, etc.), but not authenticated through the IDP 102.

However, when the amount of the transaction is more than the defined threshold, the SDK 118 (or the mobile application 108, the SDK 112, or the pay application 116, etc.) transmits a message to the repository 104, via the IDP 102, for example, for non-local authentication of the user 110. The message may include, for example, a biometric of the user 110 (e.g., captured by the communication device 106 (and/or the mobile application 108 and/or the pay application 116), etc.), etc., and may be encrypted by a public key for the IDP 102, and decrypted by the IDP 102 prior to transmission to the repository 104. The repository 104, in turn, receives and decrypts the message and compares the biometric from the message to a biometric reference therein for the user 110. The repository 104 then responds to the communication device 106, via the IDP 102, for example, indicating whether the captured biometric was matched to a biometric reference therein, or not. When the repository 104 indicates the match, the pay application 116 is permitted to proceed in interacting with a merchant (not shown) and/or providing a payment account credential (e.g., a token, etc.) to permit the transaction to proceed while being funded by the payment account provisioned to the pay application 116 (even when in excess of the threshold). It should be appreciated that beyond a threshold amount, other rules and/or criteria may be employed to decide between local and non-local authentication of the user 110.

What's more, the same or similar steps to those above may be employed to make payments within the pay application 116 or in a related, associated and/or integrated application where authentication of the user 110 is desired and/or required.

FIG. 5 illustrates an exemplary method 500 for use in managing access to digital identities associated with mobile devices. The exemplary method 500 is described as implemented in the mobile application platform 120, the banking institution 122, the communication device 106, and the mobile application 108 and/or SDK 112 of the system 100. Reference is also made to the computing device 200. However, the methods herein should not be understood to be limited to the system 100 or the computing device 200, as the methods may be implemented in other systems and/or computing devices. Likewise, the systems and the computing devices herein should not be understood to be limited to the exemplary method 500.

In addition in the method 500 (and in the other methods herein), the mobile application 108 is referred to as performing several different operations and/or processes, regardless of whether the operations and/or processes are performed by the mobile application 108, the SDK 112, or even an operating system of the communication device 106, alone or in combination. It should therefore be appreciated that such reference is simply for convenience. As such, it should also be appreciated that any of the same operations and/or processes may be performed by any one or combination of the mobile application 108, the SDK 112, and operating system of the communication device 106 unless specifically stated otherwise.

With that said, at the outset in the method 500, the user 110 launches, at 502, the mobile application 108 in the communication device 106. Thereafter, the mobile application 108 (alone, in combination with, or by the SDK 112) determines, at 504, whether a change to the identity data of the user 110 has occurred, in general or subsequently to a prior access to the mobile application 108. A change in identity data for the user 110 may include, for example, a change (or attempted change) of the user's address, a change in phone number, etc. In addition, and whether a change is determined, or not, the mobile application 108 also prompts, at 506, the user 110 for a biometric (or other login credential for the mobile application 108 and/or SDK 112). In response, the user 110 responds by providing a biometric (e.g., a fingerprint, a facial image, a retina scan, a voice input, etc.) to the communication device 106, at 508. In turn, the mobile application 108 captures, at 510, the biometric from the user 110 and the user 110 is authenticated, at 512, by the mobile application 108. The authentication is based on the captured biometric matching (e.g., within generally accepted thresholds, etc.) a biometric reference (based on generally accepted biometric comparison techniques).

When the authentication is successful, access to the mobile application 108 (and the services and/or functions therein) is granted subject to a change in the digital identity of the user 110. Specifically, at this point in the method 500, if a change in identity data for the user 110 is determined at 504, access to the mobile application 108 is held (even if the user 110 is authenticated at 512). And, the mobile application 108 prompts the user 110, at 514, to select or otherwise indicate an institution through which additional authentication of the user 110 may be performed. In particular in this embodiment, the mobile application 108 displays an interface (not shown) with one or multiple institutions available for selection, including the banking institution 122, and a prompt for the user 110 to select from the one or more multiple institutions. The one or multiple institutions included in the interface may include institutions previously identified by the user 110 as available for authentication, as described herein, for example, through one or more registration processes associated with the mobile application 108, or thereafter. It should be appreciated that the mobile application 108 may solicit an indication of the banking institution in a variety of different manners (e.g., through one or more interfaces, through a direct instruction, through other options, etc.), and that the user 110 may also select or otherwise identify the institution in a variety of different manners (e.g., entering a name of the institution, etc.). Regardless of the manner, though, the user 110 identifies and/or indicates in this example, at 516, the banking institution 122 to the mobile application 108.

In turn, the mobile application 108 requests, at 518, that the banking institution 122 (e.g., through a service call such as OpenID Connect, or other similar service, etc.) authenticate the user 110 (e.g., by directing the user 110 and/or the communication device 106 to a server associated with the banking institution 122 for authentication of the user 110 and later, by verifying, by the mobile application 108, the authentication of the user 110 (e.g., via an authorization code and/or token, etc.), etc.).

In response, the banking institution 122 prompts the user 110, at 520, via an interface at the communication device 106 and/or through the mobile application 108, to provide login credentials to the user's account associated with the banking institution 122. The user 110 then provides the login credentials (e.g., username, password, passcode, biometric, etc.), at 522, and the banking institution 122 authenticates, at 524, the user 110 (alone or in combination with the communication device 106) based on the provided login credentials.

When the user 110 is successfully authenticated, the banking institution 122 responds, at 526, with an indication of a successful authentication of the user 110, for example, by redirecting the user 110 to the mobile application 108 and/or otherwise indicating the successful authentication of the user 110 to the mobile application 108. And, the mobile application 108 then grants the user with access, at 528, to the mobile application 108, and specifically, the services and/or function provided thereby.

In this manner, the user 110 is authenticated to the mobile application 108, whereupon the user 110 is provided with access to the mobile application 108 (and the services and/or functions offered thereby). More specifically, even in view of the change to the identity data of the user 110, the user 110 is not required to obtain and subsequently provide a one-time token (e.g., passwords, codes, etc.) for and/or in association with accessing the mobile application 108, from the platform 120. Instead, the platform 120 and/or the mobile application 108 is able to rely on the authentication of the user by the third party (i.e., by the banking institution 122 in the above example of method 500) and thus not seek further and/or additional direct authentication of the user directly from the user 110 (i.e., the mobile application 108 makes use of the alternative authentication at the third party in this implementation in lieu of using a one-time user token or other authentication, etc.).

In one or more embodiments, the systems and methods herein provide for verified application installation instances, verified device integrity, verified application signatures, controlled and authenticated activation and/or enrollment of applications via one time use activation codes sent from a trusted source, authentication for an existing user (i.e., biometrics) only after the user is verified with previously used authentication credentials, etc. Further, the systems and methods herein may benefit from distributing certain data to avoid certain issues and/or vulnerabilities, such as, for example, scalable attacks (e.g., as tokens may be bound per communication device, and not in a centralized repository, etc.). In addition, the systems and methods herein may benefit from personal identifying information or PII (broadly, data) being secured within the communication device 106 through hardware security (e.g., via trusted execution environment or TEE, etc.) or, alternatively, through software cryptography. What's more, in some embodiments, payment credentials or other data included in the communication device 106 may not be stored in unencrypted manners (or in the clear). Further, the systems and methods herein may rely on continuous integrity checks to detect rooting and malware detection in certain embodiments and/or implementations. Further still, the systems and methods herein may employ strong multi factor user and/or device authentication schemes (including some of the steps herein), while also relying on certain analytics (e.g., behavioral analytics, etc.) related to and/or relevant to authentication of the user 110.

Again and as previously described, it should be appreciated that the functions described herein, in some embodiments, may be described in computer executable instructions stored on a computer readable media, and executable by one or more processors. The computer readable media is a non-transitory computer readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by performing at least one or more of the following operations: (a) capturing, by a mobile communication device, an image of a physical document, the image including a biometric of a user associated with the physical document; (b) extracting, by the mobile communication device, the biometric from the image and converting the biometric to a biometric template; (c) capturing, by the mobile communication device, via an input device of the mobile communication device, a biometric of the user; (d) comparing, by the mobile communication device, the captured biometric of the user to the biometric template; (e) when the captured biometric of the user and the biometric template match: (i) transmitting, by the mobile communication device, a message to an identification provider comprising at least the image of the physical document and the biometric template, whereby the biometric template is verified against a repository of biometric data; and (ii) binding data representative of the mobile communication device, a mobile application included in the mobile communication device, and at least one of the biometric template and the captured biometric of the user into a token, in response to a signed result indicative of a verification of the biometric template, thereby enabling the mobile application to provide a digital identity associated with the user to one or more relying parties through use of the token; (f) checking, by the mobile communication device, an integrity of the image of the physical document prior to converting the extracted biometric to a biometric template (g) generating, by the mobile communication device, a public-private key pair and transmitting a public key of the public-private key pair to the identification provider (h) receiving a message from the identification provider including the signed result; (i) decrypting the message based on a private key of the public-private key pair; and (j) encrypting the message to the identification provider based on a public key of the identification provider, prior to transmitting the message to the identification provider.

As will be appreciated based on the foregoing specification, the above-described embodiments of the disclosure may be implemented using computer programming or engineering techniques including computer software, firmware, hardware or any combination or subset thereof, wherein the technical effect may be achieved by performing at least one or more of the following operations: (a) determining, by a mobile communication device, that identity data of a user is changed; (b) prompting, by the mobile communication device, the user to identify a third party separate from the mobile communication device to authenticate the user, wherein the user is associated with an account of the third party and login credentials associated with the account; (c) requesting the third party to authenticate the user; (d) granting, by the mobile communication device, access to one or more services and/or functions of a mobile application installed at the mobile communication device, when the third party responds with an indication of a successful authentication, thereby relying on authentication of the user by the third party in order to grant access to the one or more services and/or functions of the mobile application installed at the mobile communication device; (e) soliciting, by the mobile communication device, a biometric from the user; (f) capturing, by the mobile communication device, the biometric from the user; and (g) authenticating the user against a biometric template stored at the mobile communication device, based on the captured biometric, prior to granting access to the one or more services and/or functions of the mobile application.

Exemplary embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular exemplary embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for use in providing a digital identity in association with a mobile communication device, the method comprising:
   capturing, by a mobile communication device, an image of a physical document, the image including a biometric of a user associated with the physical document;
   extracting, by the mobile communication device, the biometric from the image and converting the biometric to a biometric template;
   capturing, by the mobile communication device, via an input device of the mobile communication device, a biometric of the user;
   comparing, by the mobile communication device, the captured biometric of the user to the biometric template; and
   in response to a match between the captured biometric of the user and the biometric template:
      encrypting, by the mobile communication device, a message with a public key included in the mobile communication device and known to an identification provider, the message comprising at least the image of the physical document and the biometric template; and
      transmitting, by the mobile communication device, the encrypted message to the identification provider, whereby the biometric template is decrypted and verified; and then
   receiving, by the mobile communication device, a result from the identification provider, which is signed by the identification provider and indicative of a verification of the biometric template; and in response to the signed result:
      binding, by the mobile communication device, data representative of the mobile communication device, a mobile application included in the mobile communication device, and at least one of the biometric template and the captured biometric of the user into a token; and
      retaining the token in a memory of the mobile communication device as a basis to subsequently authenticate the user at the mobile communication device, wherein the memory of the mobile communication device is a trusted execution environment (TEE) of the mobile communication device, thereby enabling the mobile application to provide a digital identity associated with the user to one or more relying parties when the user is authenticated at the mobile communication device based on the token.

2. The computer-implemented method of claim 1, wherein the physical document includes a government ID card.

3. The computer-implemented method of claim 1, further comprising checking, by the mobile communication device, an integrity of the image of the physical document prior to converting the extracted biometric to a biometric template.

4. The computer-implemented method of claim 3, wherein the captured biometric of the user includes a facial image of the user.

5. The computer-implemented method of claim 1, further comprising:
   generating, by the mobile communication device, a public-private key pair and
   transmitting a public key of the public-private key pair to the identification provider.

6. The computer-implemented method of claim 5, further comprising:
   receiving a message from the identification provider including the result, wherein the result is signed by the identification provider with the transmitted public key; and
   decrypting the message based on a private key of the public-private key pair.

7. A non-transitory computer readable storage media comprising computer-executable instructions for managing digital identities, that when executed by at least one processor of a mobile communication device, cause the at least one processor of the mobile communication device to:
   capture an image of a physical document associated with a user of the mobile communication device, the image including a biometric of the user;
   extract the biometric from the image and convert the biometric to a biometric template;
   capture a biometric of the user and compare the captured biometric of the user to the biometric template;
   when the captured biometric of the user matches the biometric template, encrypt a message with a public key included in the mobile communication device and known to an identification provider, the encrypted message including at least the image of the physical document and the biometric template, and transmit the message to the identification provider, whereby the biometric template is verified by the identification provider against a repository of biometric data;
   receive a signed result from the identification provider, the signed result indicative of verification of the biometric template; and
   in response to the signed result:
      bind data representative of the mobile communication device, a mobile application included in the mobile communication device, and at least one of the biometric template and the captured biometric of the user into a token; and
      store the token in a trusted execution environment (TEE) of the mobile communication device, thereby enabling the mobile application to provide a digital identity associated with the user to one or more relying parties based on authentication of the user through use of the token.

8. The non-transitory computer readable storage media of claim 7, wherein the instructions, when executed by the at least one processor of the mobile communication device, further cause the at least one processor to check an integrity of the image of the physical document prior to converting the extracted biometric to a biometric template.

9. The non-transitory computer readable storage media of claim 8, wherein the instructions, when executed by the at least one processor of the mobile communication device, cause the at least one processor, in connection with capturing the biometric of the user, to perform a liveness validation of the user and confirm that the captured biometric is from a living person.

10. The non-transitory computer readable storage media of claim 9, wherein the captured biometric of the user includes a facial image of the user.

11. The non-transitory computer readable storage media of claim 7, wherein the public key includes a public key of the identification provider; and
    wherein the instructions, when executed by the at least one processor of the mobile communication device, further cause the at least one processor to generate a public-private key pair and transmit a public key of the public-private key pair to the identification provider.

12. The non-transitory computer readable storage media of claim 11, wherein the instructions, when executed by the at least one processor of the mobile communication device, further cause the at least one processor to:

receive a message from the identification provider including the signed result, wherein the signed result is signed by the identification provider with the transmitted public key; and decrypt the message based on a private key of the public-private key pair.

13. The computer-implemented method of claim 1, further comprising receiving a registration challenge for the user, from the identification provider; and wherein extracting the biometric from the image includes extracting the biometric from the image in response to the registration challenge for the user.

14. The non-transitory computer readable storage media of claim 7, wherein the computer-executable instructions define at least a portion of a software development kit (SDK) included in the mobile application.

15. The non-transitory computer readable storage media of claim 7, wherein the computer-executable instructions, when executed by the at least one processor of the mobile communication device, cause the at least one processor to receive a registration challenge for the user, from the identification provider, and to extract the biometric from the image in response to the registration challenge.

16. A mobile communication device comprising:
a memory including executable instructions; and
a processor coupled to the memory, wherein the processor is configured, by the executable instructions, to:
capture an image of a physical document, the image including a biometric of a user associated with the physical document;
extract the biometric from the image and convert the biometric to a biometric template;
capture, via an input device of the mobile communication device, a biometric of the user;
compare the captured biometric of the user to the biometric template; and
in response to a match between the captured biometric of the user and the biometric template:
encrypt a message with a public key included in the mobile communication device and known to an identification provider, the message comprising at least the image of the physical document and the biometric template; and
transmit the encrypted message to the identification provider, whereby the biometric template is decrypted and verified; and then
receive a result from the identification provider, which is signed by the identification provider and indicative of a verification of the biometric template; and
in response to the signed result:
bind data representative of the mobile communication device, a mobile application included in the mobile communication device, and at least one of the biometric template and the captured biometric of the user into a token; and
retain the token in a trusted execution environment (TEE) of a memory of the mobile communication device as a basis to subsequently authenticate the user at the mobile communication device, thereby enabling the mobile application to provide a digital identity associated with the user to one or more relying parties when the user is authenticated at the mobile communication device based on the token.

17. The mobile communication device of claim 16, wherein the physical document includes a government ID card; and wherein the captured biometric of the user includes a facial image of the user.

18. The mobile communication device of claim 16, wherein the processor is configured, by the executable instructions, to check an integrity of the image of the physical document prior to converting the extracted biometric to a biometric template.

19. The mobile communication device of claim 16, wherein the processor is further configured, by the executable instructions, to:
generate a public-private key pair;
transmit a public key of the public-private key pair to the identification provider; and
decrypt the result based on a private key of the public-private key pair.

20. The mobile communication device of claim 16, wherein the executable instructions define at least a portion of a software development kit (SDK) included in the mobile application; and wherein the mobile application includes a banking application.

* * * * *